United States Patent Office 3,473,640
Patented Oct. 21, 1969

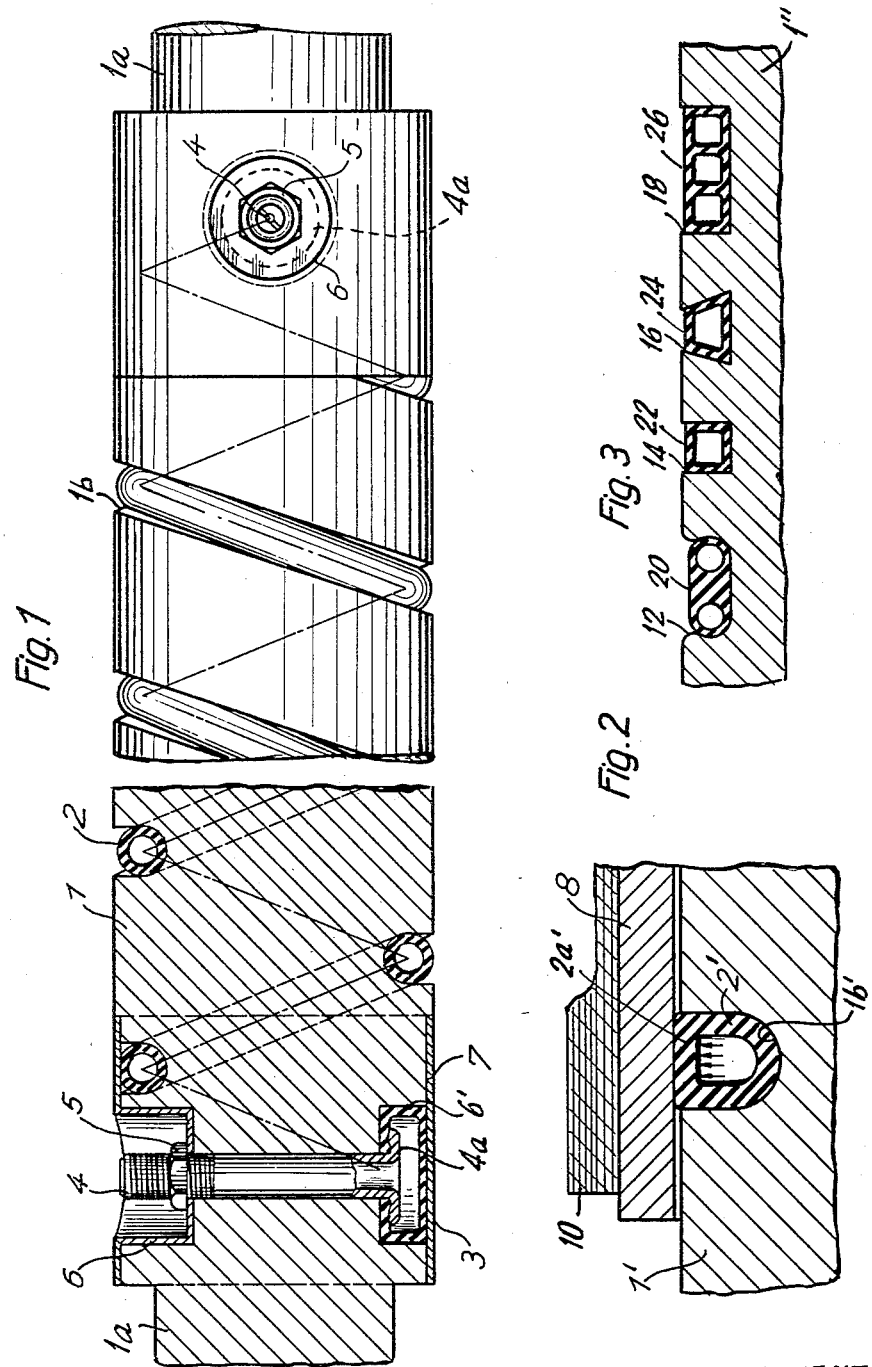

3,473,640
DRIVE SHAFT WITH INFLATABLE
TUBE COUPLING
Rudolf Schütz, Hofstetten, Pielach, Austria, assignor to
Polytype AG, Freiburg, Switzerland
Filed Nov. 13, 1967, Ser. No. 682,275
Claims priority, application Austria, Nov. 16, 1967,
A 10,570/67
Int. Cl. F16d 25/04
U.S. Cl. 192—88                                                    6 Claims

ABSTRACT OF THE DISCLOSURE

An apparatus for providing driving engagement between a shaft and a sleeve member includes a drive shaft having one or more grooves therein with a corresponding number of inflatable tubular members arranged in the groove and adapted to be connected to means for inflating the tubes so that the tubes expand outwardly to engage the interior wall of a sleeve member which is fitted over the shaft. The apparatus is particularly usable for winding and unwinding devices of machines employed in plastic, paper, and textile industries. In the inventive construction a single tube or two tubes are arranged in grooves which extend across at least a portion of a periphery of the driving shaft and they terminate in valve fittings adjacent the end of the shaft which are accessible for connection to a compressed air gun for inflating the tubes.

SUMMARY OF THE INVENTION

This invention relates in general to coupling devices and in particular to a new and useful device for providing a driving connection between a rotatable shaft and a surrounding sleeve member including a tube carried by the shaft which expands sufficiently to engage against the interior wall of the sleeve.

Devices for permitting the rapid connection of a driving shaft and a surrounding sleeve or reel carrying a continuous web of a material such as paper, plastic or textiles are necessary for the usual winding and unwinding devices which are employed in such industries. At the present time the various materials are wound in sheet form or strip form on sleeves or reels which are usually clamped between two cones. One or both of the cones are rotated and the rotation is imparted to the sleeve carrying the material by the pressure of engagement of the cones in the respective ends of the sleeve which is accomplished by a mechanical device. The force required for the compression is very great and depends on the braking or winding couple. Damage to the sleeve at the location of engagement by a cone is inevitable and causes much waste. A further disadvantage is that the operation for placing and connecting the cones to the sleeve is very time consuming. Some devices are known which employ mechanical elements which press against segments or the inner wall of a sleeve member but they are complicated and expensive.

In accordance with the present invention there is provided a driving shaft having a groove defined in its periphery which carries an elastic pressure tube which may be inflated so that its surface extends beyond the periphery of the driving shaft to engage against the interior wall of a sleeve which is positioned around the shaft. The amount of pressure engagement between the driving shaft and the surrounding sleeve may be regulated by the amount of compressed air which is forced into the tube. In the preferred form the shaft is provided with a continuous spiral or helical groove and each end of a continuous inflatable tube in the groove terminates at the respective end of the shaft in a valve fitting to permit the easy inflation or deflation thereof.

An object of the invention is to provide a driving shaft which is adapted to receive a sleeve member thereover and to drivingly engage this sleeve for rotation with the shaft and which includes at least one groove defined in the periphery thereof which contains an inflatable tube which may be inflated sufficiently to cause the tube to expand out of the groove and bear against the surrounding sleeve to effect a driving connection.

A further object of the invention is to provide a drive shaft having at least one groove defined therein which advantageously may be a continuous spiral groove from one side to the other in which terminates in a recess adjacent one end for a valve fitting and including a tube connected to the valve fitting and disposed in the groove and which is inflatable through the valve fitting to cause it to expand out of the groove for gripping a surrounding element arranged around the shaft.

A further object of the invention is to provide a coupling device for effecting a coupling connection between a rotatable drive shaft and a surrounding sleeve which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a partial longitudinal sectional view and elevational view of a rotatable drive shaft with an expandable tube coupler constructed in accordance with the invention;

FIG. 2 is an enlarged partial transverse sectional view of the shaft and coupling tube indicating the engagement between a shaft and a sleeve member to be rotated; and FIG. 3 is a schematic partial longitudinal section of a drive shaft having several different types of expandable tube coupling arranged at separate groove locations along its length.

GENERAL DESCRIPTION OF THE PREFERRED EMBODIMENTS

Referring to the drawings in particular the invention embodied therein in FIG. 1 comprises a drive shaft 1 having journal elements or axles 1a at each end for supporting the shaft for rotation.

In accordance with the invention the shaft 1 may be of cylindrical rectangular or other configurations and is provided with coupling means for effecting a driving rotatable connection between the shaft 1 and a surrounding sleeve or reel member such as the member 8 indicated in the embodiment in FIG. 2. The coupling means includes a continuous groove which in this embodiment is a helical or spiral groove 1b in which is positioned an elastic pressure tube 2. At each end of the shaft 1 there is provided adapter pieces 3 which fit into recesses defined at opposite sides of the shaft. The adapter pieces 3 include trough shaped elements or pans 6 and 6′ which are located in the recesses and which engage respective ends of a valve fitting 4 which extends through the shaft 1. The valve fitting 4 is flanged at 4a to engage the interior of the trough member 6′ which also forms a chamber for one end of the tube 2. The valve fitting 4 is tightened in position by a nut 5 which is threaded against the trough shaped member 6 on the opposite side of the shaft 1.

In the embodiment of FIG. 1 a valve fitting 4 is provided at each end of the shaft and connected to the respective ends of tube 2. Each fitting 4 advantageously includes a valve stem or air control member 4a which may be pressed to deflate the tube 2 or to permit connection of the fitting 4 to a source of air under pressure such as to a portable compressed air gun. In some instances the trough member 6 is provided with a connecting button to the valve fitting to permit selective bleeding of the air in order to regulate the pressure in the tube 2 and hence the amount of expansion of the tube 2 outwardly from its associated groove to engage a surrounding sleeve member.

In the embodiment indicated in FIG. 2 a shaft 1′ includes at least one groove 1b′ which accommodates a tube 2′ of a configuration such that its outer edge 2a′ is substantially parallel to the axis of the shaft 1′ and bears uniformly outwardly against a sleeve or reel member 8 carrying continuous web materials such as a paper web 10.

In the embodiment indicated in FIG. 3 a shaft 1″ may, for example, have different types of grooves defined along its length such as grooves 12, 14, 16 and 18 of a configuration to accommodate a double tube 20, a square tube 22, a trapezoidal tube 24, and a triple square tube 26. The showing in FIG. 3 is by way of example but naturally it would be possible to provide tubes of this configuration on a shaft of that construction should the coupling requirements between the shaft and an associated surrounding member require it.

The invention provides a simple means for effecting the driving connection between a shaft 1′ and a surrounding sleeve 8 simply by regulating the internal pressure within the tube 2′. The construction is such that no special fit between the shaft 1′ and the sleeve 8 is required since the inflation of the tube effects an automatic centering. A further advantage is that the force transmitting connection between the shaft 1 and the surrounding sleeve 8 is elastic enough to limit tearing of the paper web 10 when it is either wound or unwound from the sleeve 8. The amount of pressure in the tube 2′ is advantageously regulated by an operator by reading a gauge which is advantageously mounted directed on a portable compressed air gun. The angle of pitch of the helical groove 1b on the embodiment of FIG. 1 is advantageously chosen in accordance with the desired coupling force and in accordance with the available pressure of the inflating air which is available.

When the sleeve 8 is to be removed from the driving shaft 1′ it is merely necessary to deflate the tube 2′ such as by pressing an air valve or a connecting button to open the valve fitting.

While specific embodiments of the invention have been shown and described in detail to illustrate the application of the invention principles, it will be understood that the invention may be embodied otherwise without departing from such principles.

What is claimed is:

1. A device for coupling a rotatable shaft to a surrounding sleeve comprising a rotatable shaft having a continuous groove defined in the peripheral surface thereof, an inflatable tube disposed in said continuous groove, a cavity defined on diametrically opposite sides of said tube adjacent one end thereof, a valve fitting extending through said tube and terminating at each end in a respective cavity, said inflatable tube extending into one of said cavities and communicating with said valve fitting within said cavities, said fitting terminating in the opposite cavity in an accessible position for inflation and deflation of said tube through said fitting.

2. A device according to claim 1, wherein the groove comprises a continuous spiral groove extending across the width of said shaft.

3. A device according to claim 1, wherein said tube cross section is substantially circular.

4. A device according to claim 1, wherein said inflatable tube cross section is such that the outer edge thereof extends substantially parallel to the axis of said shaft.

5. A device according to claim 1, wherein said inflatable tube is of a non-circular cross section.

6. A device according to claim 1, wherein said fitting comprises a tube flanged at one end and bearing with its flange against the walls of the cavity of said shaft and having an opposite end extending into the opposite cavity of said shaft, a nut threaded onto said fitting and bearing against the interior wall of the opposite cavity of said shaft to urge said fitting flange portion against the closed cavity of said shaft.

References Cited

UNITED STATES PATENTS

| | | | |
|---|---|---|---|
| 58,469 | 10/1866 | Parker | 285—97 X |
| 467,288 | 1/1892 | Jennings. | |
| 2,245,682 | 6/1941 | Kerr. | |
| 2,141,645 | 12/1938 | Fawick. | |
| 2,246,979 | 6/1941 | Kraft et al. | |
| 2,640,565 | 6/1953 | Hoppenstand | 188—152.86 |

FOREIGN PATENTS 452,992  11/1948  Canada.

BENJAMIN W. WYCHE III, Primary Examiner

U.S. Cl. X.R.

64—30; 188—152; 285—97